United States Patent

[11] 3,616,332

| | | |
|---|---|---|
| [72] | Inventors | George A. Miller<br>South Attleboro, Mass.;<br>Keith N. Johnson, Cumberland, R.I. |
| [21] | Appl. No. | 885,767 |
| [22] | Filed | Dec. 17, 1969 |
| [45] | Patented | Oct. 26, 1971 |
| [73] | Assignee | Texas Instruments Incorporated<br>Dallas, Tex. |

[54] PROCESS FOR RECOVERING SILVER FROM SCRAP MATERIALS AND ELECTROLYTE COMPOSITION FOR USE THEREIN
22 Claims, 1 Drawing Fig.

| | | |
|---|---|---|
| [52] | U.S. Cl. | 204/109 |
| [51] | Int. Cl. | C22d 1/12 |
| [50] | Field of Search | 204/105, 109, 46, 47 |

[56] References Cited
UNITED STATES PATENTS

| 2,905,601 | 9/1959 | Rinker | 204/43 |
| 3,149,057 | 9/1964 | Parker | 204/46 |

*Primary Examiner*—Winston A. Douglas
*Assistant Examiner*—H. A. Feeley
*Attorneys*—Harold Levine, Edward J. Connors, Jr., John A. Haug, James P. McAndrews and Gerald B. Epstein ABSTRACT: Substantially pure silver is economically and effectively recovered from scrap material, such as scrap material containing silver, silver oxide and other metals such as cadmium, copper, nickel and the like in elemental or combined form, by electrolysis of an aqueous electrolyte solution containing silver sulfamate, a glutamic acid compound such as monosodium glutamate monohydrate and an excess of sulfamic acid. The scrap material itself serves as the anode and fine grained silver is deposited at a cathode of corrosion-resistant material without substantial codeposition of any other metals from the scrap. During electrolysis, silver and any other metals present in the anode scrap material are dissolved electrolytically and the metals in combined form are dissolved chemically in the electrolyte. Because of the high solubility of silver sulfamate in the electrolyte, high current densities on the order of 30 to 300 amperes per square foot may be employed. When substantial quantities of cadmium and metal ions other than silver buildup in the electrolyte, substantially all of the silver therein may be recovered by subjecting the electrolyte to further electrolysis using inert electrodes as the anode and cathode followed by precipitation of the remaining silver as silver chloride or other insoluble silver compound. Cadmium may then be recovered from the resulting electrolyte by precipitation as cadmium hydroxide or other insoluble cadmium compound.

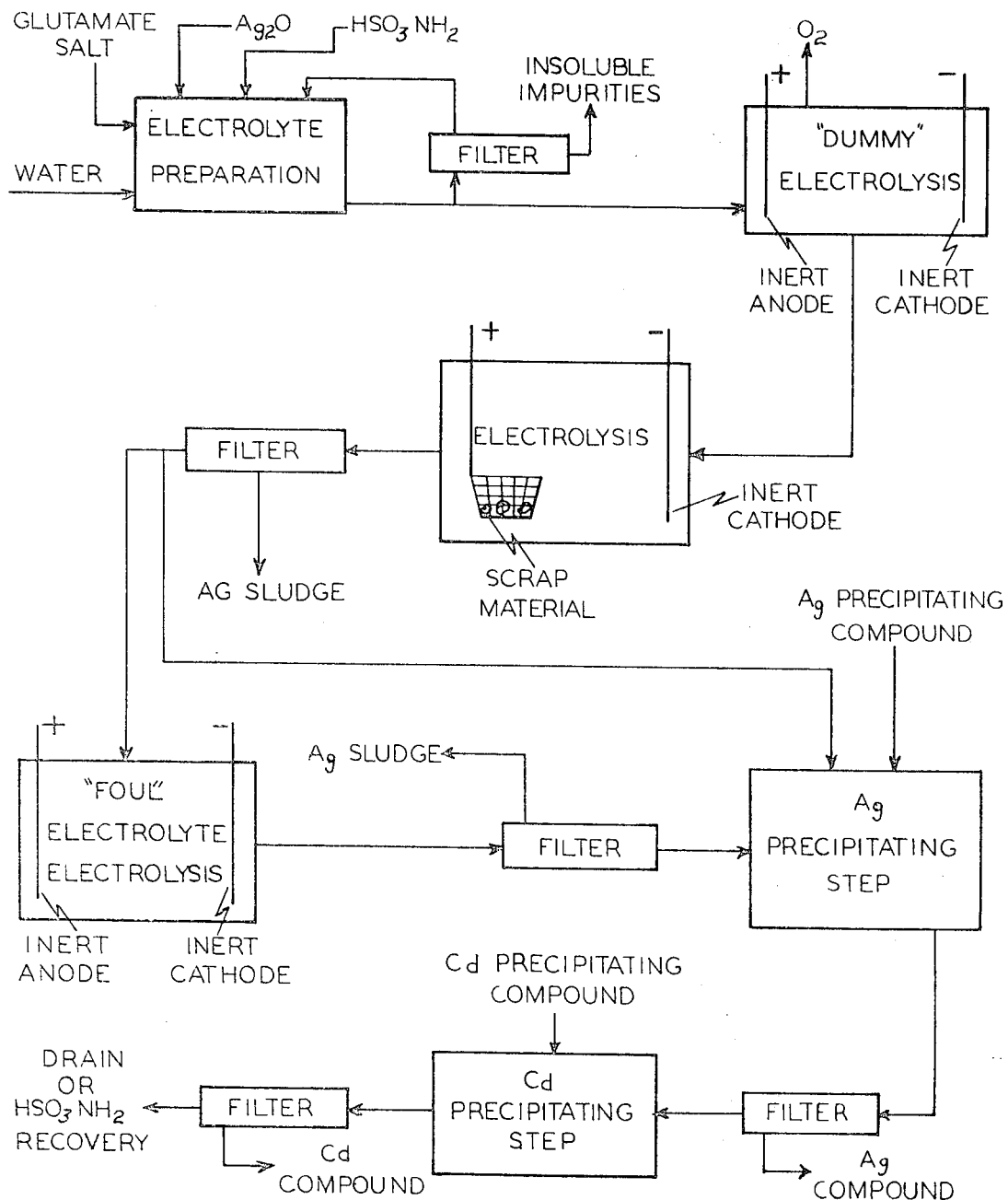
INVENTORS.
GEORGE A. MILLER
KEITH N. JOHNSON

PROCESS FOR RECOVERING SILVER FROM SCRAP MATERIALS AND ELECTROLYTE COMPOSITION FOR USE THEREIN

This invention relates to the art of recovering metals from scrap materials, and more particularly, relates to an improved electrolytic process for recovering substantially pure silver from silver-bearing scrap materials and for recovering both silver and cadmium from scrap materials containing appreciable amounts of both metals in elemental or combined form.

Prior to the present invention, silver has been recovered from silver-bearing scrap materials by both thermal and electrolytic processes. Thermal processes have been satisfactory for some purposes, but have not been found capable of producing silver of the desired high purity. Silver recovered by thermal processing has typically contained 0.2 to 0.3 percent of other metals as impurities. This has been a particular problem when scraps containing copper have been processed. THe prior art electrolytic processes have been capable, by careful operation, of producing a substantially pure silver, in the range of 99.9 to 99.99 percent purity. However, these prior art electrolytic processes have also been subject to certain drawbacks.

The most widely used prior art electrolytic process for recovery of silver from scrap material has been the so-called nitrate process. In the nitrate process, the scrap material is dissolved in nitric acid and the silver electrolytically deposited at the cathode. While this process has been used commercially for some time, maximum current densities attainable have been no higher than about 25 to about 50 amperes per square foot of electrode area. Current densities have been thus limited by the conductivity of the electrolytic solution. Since the electrodeposition rate in an electrolytic process is directly proportional to the current applied, the productive capacity of the nitrate process has been limited to between about 1,000 and about 2,000 grams of silver deposited per square foot of cathode area per hour. Moreover, the silver nitrate bath used in the nitrate process gives off noxious fumes of nitrogen dioxide when heated to the temperature required for electrodeposition of silver. To avoid injury to personnel, special equipment is therefore required in connection with the nitrate process. Since an excess of nitric acid is used, the nitrate bath is also very corrosive, requiring the use of expensive corrosion-resistant materials in all equipment with which the bath comes in contact. Also, deleterious side reactions frequently take place in the nitrate bath, reducing the efficiency of silver recovery. If the scrap material contains appreciable amounts of cadmium oxide, additional problems arise in the use of the nitrate process. The limited solubility of cadmium in the nitrate medium limits the useful life of the nitrate bath, since electrolytic recovery of silver must terminate as the solubility limit of cadmium compounds present is approached.

Accordingly, there has been a need for a commercially useful silver refining or recovery process which avoids these shortcomings of the prior art.

Among the several objects of the present invention, therefore, may be noted the provision of an improved process for recovery of substantially pure silver from silver-bearing scrap material; the provision of an electrolytic process for recovery of substantially pure silver which operates at higher current densities than permitted by available commercial processes; the provision of such an electrolytic process for silver recovery which does not require the use of special equipment; the provision of an electrolytic process for silver recovery which involves a minimum of side reactions; the provision of such a process which recovers silver from scrap material in very high yield; the provision of a process for silver recovery from a scrap material containing significant quantities of cadmium oxide; the provision of an electrolytic process for recovery of silver in which substantially pure silver is deposited at the cathode without substantial codeposition of any other metal from the scrap material; the provision of a process for recovery of silver from a scrap material containing other metals such as copper, cobalt, nickel and the like; the provision of a process for silver recovery from a scrap material containing cadmium oxide wherein the cadmium can also be recovered in the form of a water insoluble cadmium compound; the provision of electrolyte compositions useful in the electrolytic recovery of silver from scrap material; the provision of such compositions which have a high solubility for cadmium ions; the provision of compositions useful in the electrolytic recovery of silver which are noncorrosive and do not generate noxious fumes; and the provision of compositions useful in the recovery of silver from scrap material from which cadmium is subject to selective precipitation by the addition of a water-soluble compound which reacts with cadmium ions to form an insoluble cadmium compound. Other objects and features of the present invention will be in part apparent and in part pointed out hereinafter.

The present invention is thus directed to a process for recovering substantially pure silver from silver-bearing scrap material which comprises immersing an anode of said scrap material and a cathode of a corrosion-resistant material in an electrolyte comprising an aqueous solution of silver sulfamate, a glutamic acid compound selected from the group consisting of glutamic acid and the water soluble salts thereof, and an excess of sulfamic acid, electrolyzing said solution to electrolytically dissolve the silver in said anode, and depositing the silver at the cathode without substantial codeposition of any other metals present in said scrap material. The present invention is further directed to the above-described process wherein, after a substantial quantity of metal ions other than silver ions have accumulated in the electrolyte solution, electrolysis is terminated and the electrolyte is separately subjected to further electrolysis using an inert anode and a cathode of a corrosion-resistant material whereby substantially pure silver is deposited at the cathode. The present invention further includes the steps of treating the electrolyte from such further electrolysis or the electrolyte from the first electrolysis to precipitate any remaining silver as an insoluble silver compound, separating the insoluble silver compound, precipitating the cadmium from the resulting solution as an insoluble cadmium compound and thereafter separating the insoluble cadmium compound. The present invention also encompasses a novel electrolyte composition for use in the recovery of substantially pure silver from silver-bearing scrap materials by the above-noted processes which comprises an aqueous solution containing silver sulfamate, a glutamic acid compound selected from the group consisting of glutamic acid and the water soluble salts thereof, and an excess of sulfamic acid.

In the accompanying drawing, the FIGURE is a flow diagram illustrating the various steps utilized in carrying out the processes of the invention.

In accordance with the present invention, it has been discovered that substantially pure silver can be advantageously and efficiently recovered from silver-bearing scrap material by electrolysis of an aqueous solution containing silver sulfamate, a glutamic acid compound and an excess of sulfamic acid, the scrap material serving as a consumable anode and silver being deposited at the cathode. Electrolysis of such a sulfamate bath proceeds with high current efficiency at substantially higher current densities than those attainable with the prior art nitrate process, up to six to 12 times as high if desired. No noxious fumes emanate form the sulfamate bath, the bath is generally noncorrosive, and moderate quantities of the ions of other metal present in the scrap may accumulate in the solution without impeding or interfering with the electrodeposition of silver at the cathode. The bath is particularly suited for use in the recovery of silver from scrap material containing significant quantities of cadmium in either elemental or combined form. For example, scrap material from silver base alloys used in making electrical contacts of the type disclosed in U.S. Pat. No. 3,472,654 and containing up to 15 percent cadmium oxide may be effectively processed for silver and cadmium recovery through the present invention. In practicing the invention, cadmium ions may be allowed to accumulate to substantial concentrations within the electrolytic solution without adversely affecting the electrodeposition of silver. Moreover, the silver ion concentration of the bath can be electrolytically depleted, as hereinafter described, without adverse effect from the presence of said substantial concentrations of cadmium ions and other metal ions, substantially pure silver depositing at the cathode during such depletion of the bath. The depleted bath may then be chemically treated to successively precipitate an insoluble silver compound and an insoluble cadmium compound, essentially quantitative recovery of silver and cadmium from the scrap thus being achieved.

The electrolyte bath composition useful in the practice of this invention comprises an aqueous solution of silver sulfamate and an excess of sulfamic acid. In addition, the bath contains glutamic acid or one of its water soluble salts as an essential component. The presence of the glutamic acid compound is necessary to assure that a layered, fine grained deposit of silver is formed on the cathode throughout electrolysis. If no glutamic acid compound is present in the solution, silver generated at the cathode tends to form into dendritic crystals. Such crystals are undesirable since they do not constitute a convenient configuration for handling and because they tend to break off from the cathode and float through the electrolyte solution. Cations other than silver, such as nickel, copper, cobalt and the like may be present in moderate quantities in the composition of this invention during electrolysis without adversely affecting the electrodeposition of silver. Cadmium may be present in substantial quantities without adverse effect. Many scrap materials containing silver are likely to contain such metals as cadmium, nickel, copper and cobalt and electrolysis using scrap of this nature as a consumable anode results in the accumulation of ions of these metals in the electrolyte solution. The composition and processes of this invention are well adapted for silver recovery from such scrap materials, and are particularly adapted to the recovery of both silver and cadmium from scraps containing elemental or combined cadmium.

Any glutamic acid compound which fosters the formation of a layered or fine grained deposit of silver at the cathode is useful in the compositions and processes of the invention. Glutamic acid or any of its water soluble salts may be used for this purpose. More particularly, monoammonium glutamate, alkali metal salts of glutamic acid, such as monosodium glutamate and monopotassium glutamate, and alkaline earth metal salts of glutamic acid, such as calcium and magnesium glutamate, are useful in the practice of the invention. The use of monosodium glutamate monohydrate is preferred because it is economical and readily available.

In the preferred embodiment of this invention, a liter of the novel electrolyte composition contains between about 60 and about 140 grams of silver ions (generally between about 100 and 120 grams), between about 5 and about 15 grams of monosodium glutamate monohydrate and an excess of between about 7 and about 15 grams of sulfamic acid. During electrolysis, for example, a liter of this solution may also contain not more than about 260 grams of cadmium ions, not more than about 70 grams of copper ions, not more than about 40 grams of nickel ions, and not more than about 40 grams of cobalt ions. A composition which has been found particularly useful in the practice of this invention is constituted such that a liter of said composition contains about 110 grams of silver ions, about 11 grams of monosodium glutamate monohydrate and an excess of about 13 grams of sulfamic acid.

As an optional component, the composition may also contain a wetting agent or anionic surfactant such as the fluorochemical anionic surfactant sold under the trade designation "3M FC-98" by Minnesota Mining and Mfg. CO. Various other surfactants known to those skilled in the art may also be used. The surfactant cooperates with the glutamate salt to promote the formation of a layered deposit of silver at the cathode and also functions to lower the surface tension of the electrolyte solution. In the preferred embodiment of the invention, the surfactant is present in an amount constituting between about 0.05 and 0.5 percent by weight of the composition.

Referring to the accompanying flow sheet, the electrolyte composition of the present invention is prepared by dissolving silver oxide in sulfamic acid. The silver oxide is first slurried in water and the resulting mixture is heated. Sulfamic acid is then added to the slurry to dissolve the silver oxide. The sulfamic acid is added in an amount sufficient to provide an excess of between approximately 7 and 15 grams per liter over the stoichiometric amount required to react with the silver present to form silver sulfamate. After addition of sulfamic acid, the solution is filtered to remove insoluble impurities. A glutamic acid compound such as monosodium glutamate monohydrate is then added to the solution, after which the solution is subjected to the passage of electrical current for a relatively brief period of time, the current being applied by means of inert electrodes immersed in the solution. The purpose of this application of electrical current or so-called "dummy" electrolysis is to remove from the solution any impurities which electrolytically deposit preferentially to silver. Such impurities plate out at the cathode by means of the passage of the current, and a small quantity of oxygen is liberated at the anode.

In the step of introducing a glutamic acid compound into the solution, it will be understood that a glutamic acid salt may be added directly to the solution, be formed therein by the reaction of glutamic acid with a metal hydroxide or otherwise mixed into the solution by any convenient means.

In preparing the electrolyte solution, the slurry of silver oxide in water is preferably heated to a temperature between about 120° F. and 160° F., about 140°–150° F. being particularly desirable. The relative quantities of water, silver oxide, sulfamic acid and glutamic acid compound employed may be readily determined by one skilled in the art by reference to the preferred compositions discussed hereinabove, it being understood that these quantities may be varied while still achieving the advantages of the invention. In the above-described "dummy" electrolysis step, impurities which plate out at the cathode preferentially to silver are removed by applying an electrical current of between about 0.5 and about 1.5 amperes per square foot of electrode area for a period of about one to three hours. During passage of electrical current, the temperature of the solution is maintained between about 140° F. and 170° F., preferably about 145° F. After completion of this so-called dummy electrolysis, the electrodes used therein are removed from the solution and the solution is then ready for use in the recovery of silver from scrap material.

Scrap materials from which silver may be recovered by the process of this invention include scrap materials which contain silver and silver oxide as well as other metals such as cadmium, copper, cobalt, nickel and the like in either elemental or combined form. As mentioned, the process of the invention is particularly effective in recovering silver from scrap materials which contain substantial quantities of cadmium oxide, e.g., 10 –15 percent by weight of cadmium oxide. Moreover, as noted above and as will be described in greater particularity below, the cadmium dissolving from the scrap into the electrolytic solution can be precipitated as an insoluble compound and recovered for further use. While the process of the invention may be practiced with scrap materials containing various metals, scrap materials containing significant quantities of iron will render the process inefficient due to the so-called "shuttle process," , whereby iron ions migrate back and forth between anode and cathode, using up current by oxidation to the ferric state at the anode and reduction to the ferrous state at the cathode.

In the main electrolytic recovery step, the silver-bearing scrap material serves as the anode. The scrap may be electrically connected to the anode bus bar by any convenient means, provided that no connecting means which would dissolve or electrochemically react in the electrolyte solution are immersed therein. I have found that the use of a titanium wire basket is a particularly effective means by which to contain the scrap material and provide electrical contact. The titanium wire basket is connected to the bus bar external to the solution. To retain the small particles which form as the scrap material disintegrates during electrolysis, a cloth or plastic bag is advantageously fitted over the titanium basket. The cathode may be constructed of any conducting material which is resistant to corrosion in the environment of the electrolyte bath solution during electrolysis. Stainless steel is a particularly suitable cathode material since it is corrosion resistant, conductive, and readily available.

The temperature of the electrolyte solution during the main electrolysis step is preferably between about 140° F. and about 170° F. At temperatures below 140° F., the viscosity of the solution rises, thereby impeding transference of ions in the solution and lowering the solution conductivity. Somewhat lower temperatures can, of course, be used, but below about 140° F. maximum current densities cannot be realized without excessive heat generation. Also, at temperatures significantly below 140° F., the solubility of silver sulfamate falls below the level necessary to give the desired electrolyte solution strength. At temperatures above about 170° F., sulfamic acid in the bath decomposes at an unsatisfactorily rapid rate. While temperatures in the range of about 140° F. to about 170° F. may be used I generally prefer to conduct the electrolytic recovery at about 145° F.

Electrolysis may take place in the main electrolysis step at current densities up to about 300 amperes per square foot of electrode area. Lower current densities may, of course, be used. Silver will plate out selectively and in the desired form even at current densities below one ampere per square foot. Since productivity is directly proportional to amperage, however, high current densities are preferable. Current densities above 50 amperes per square foot will provide recovery of silver at a rate higher than that attainable by the prior art nitrate process. The electrical potential required to operate the silver recovery step of this invention is quite modest, current densities of up to 300 amperes per square foot being obtainable at a voltage of only about 3.0. The cathode current efficiency of my process is quite high, i.e., 98 percent or better, even at current densities in the range of 300 amperes per square foot. Thus, at 300 amperes per square foot, silver can be plated at a rate of about 12,000 grams per hour per square foot of cathode area. This compares to a maximum plating rate of about 2,000 grams of silver per square foot per hour at 50 amperes per square foot using the prior art nitrate process.

As electrolysis proceeds, silver metal dissolves electrolytically in the solution according to the anode reaction $$Ag° \rightarrow Ag^+ + e^1$$

If any metal oxides are present in the scrap, they dissolve chemically in the solution. FOr example, any cadmium oxide present dissolves in the solution in the following manner:

$$CdO + 2HSO_3NH_2 \rightarrow Cd(SO_3NH_2)_2 + H_2O$$

In accordance with the electrochemical reaction mechanism, silver ions in the solution react electrolytically at the cathode, thereby forming a deposit of silver metal.

$$Ag^+ + e^1 \rightarrow Ag°$$

Other metal ions present in the solution do not electrolytically deposit at the cathode. Thus, the silver ion concentration in the solution remains constant at its initial level while the concentration of the ions of other metals present in the scrap increases as electrolysis proceeds. If metals other than silver are present in the scrap in elemental form, however, they dissolve in the solution electrolytically. If elemental cadmium is present, for example, it dissolves by the anode reaction.

$$Cd \rightarrow Cd^{++} + 2e^1$$

Since the concomitant cathode reaction does not involve electrodeposition of cadmium but electrodeposition of silver, silver ions are depleted from the electrolyte solution to the extent that anode reactions involving other metals take place. Thus, the presence of elemental metals other than silver in the scrap results in depletion of silver ions in solution as electrolysis proceeds. Such depletion does not present a serious obstacle to the practice of the process of this invention, however, since the silver ion concentration may be replenished or maintained at the desired level by intermittent or continuous addition of a replenisher solution of silver sulfamate.

Under the conditions which obtain during electrolysis, some decomposition of the free sulfamic acid also takes place in the electrolyte solution bath. A sulfamic acid excess should be maintained by addition of sulfamic acid to the bath if best results are to be achieved. It is particularly desirable to maintain an excess of about 7 to about 15 grams, preferably 7-10 grams, of sulfamic acid per liter of solution at all times.

As noted above, elemental and combined metals present in the scrap in addition to silver will also go into solution during electrolysis. The useful life of the electrolyte solution is determined by the rate at which ions of these other metals build up in the solution. When the concentration of these ions rise above certain tolerable levels, undesirable effects may occur such as chemical precipitation in the bath, codeposition of metals other than silver at the cathode, and a reduction in the conductivity of the electrolytic bath. Though the process will operate at higher concentrations, it is preferable to terminate electrolysis when the cadmium ion concentration reaches about 260 grams per liter, the copper ion concentration reaches about 70 grams per liter, the nickel ion concentration reaches about 40 grams per liter and/or the cobalt ion concentration reaches about 40 grams per liter.

When silver accumulates to a convenient amount on the cathode, or the electrolysis is terminated, the silver-bearing cathodes are disconnected form the bus bar and the silver recovered. In the recovery operation, the silver-bearing cathodes are first rinsed with water to remove any salts from the solution bath, then dried in an oven at a temperature of about 212° F. or higher. After drying, the silver is stripped from the cathode. A fine grained, layered deposit of silver is recovered, having a purity as high as 99.9 percent or higher.

After completion of the main electrolytic recovery step it is desirable to filter the electrolyte solution bath. As noted above, the scrap anode material disintegrates as the electrolysis proceeds. Though a cloth or plastic bag is used to retain the particles of scrap which break off during this operation, some particles are of such small size that they pass through the retaining bag thereby forming a sludge in or at the bottom of the electrolyte solution bath. Since this sludge contains significant proportions of valuable silver, it is desirable that it be recovered. This is effected by the above-mentioned filtration. THe silver sludge thus recovered may be recycled to the main electrolytic recovery step or otherwise processed for recovery of silver.

At the termination of the main electrolysis step, the electrolyte bath still contains a substantial concentration of silver ions. By means of the further steps of the process of my invention, essentially all of this silver may be recovered. When the concentration of metal ions other than silver rise to the levels noted above as preferably limiting, the electrolyte solution bath is declared "foul." As shown in the flow sheet, the first step for recovery of the silver present in this bath is referred to as the "foul" electrolyte electrolysis. The "foul" electrolyte electrolysis is carried out using inert electrodes at both the anode and the cathode. Electrical current is applied and silver proceeds to plate out at the cathode. Since there is no source of silver at the inert anode, silver ion is depleted from the solution as electrolysis proceeds. Oxygen is liberated at the anode. This electrolysis may proceed until the silver ion concentration is reduced as low as less than one gram per liter of solution, without codeposition of other metals at the cathode.

Electrodes which may be used in the "foul" electrolyte electrolysis must be inert to the electrochemical reactions taking place and must be corrosion-resistant to the environment. I have used a stainless steel electrode as the cathode and a platinum or tantalum electrode as the anode, but any material which is conductive and possesses the properties of inertness and corrosion resistance is suitable for use as either the anode or the cathode for the "foul" electrolyte electrolysis step of my invention.

The temperature of the electrolyte solution bath during the "foul" electrolyte electrolysis is preferably maintained between about 140° F. and 170° F. Above 170° F., the rate of decomposition of the sulfamic acid becomes undesirably high. Below 140° F., the conductivity of the solution becomes undesirably low. In this regard, it is to be noted that if the "foul" electrolyte contains substantial quantities of cadmium ions, for example 200 grams per liter or more, there is surprisingly no practical lower temperature limit in terms of the solubility of silver sulfamate. The solution can in fact be cooled to room temperature without precipitation of silver sulfamate. Although the explanation for this phenomenon is not entirely clear, it appears to be due to some type of complexing effect of the cadmium ion on the silver ion.

The initial current density in the "foul" electrolyte electrolysis step of this invention may be as high as 300 amperes per square foot. As the silver ion concentration is depleted, the conductivity of the solution decreases and the current density is gradually lowered to avoid excessive heat generation in the solution. No particular schedule of current reduction is critical. Since the current reduction schedule is related to heat generation, it will be understood that higher current densities are tolerable at given residual concentrations of silver ions if cooling means, such as an internal cooling coil, are provided for the electrolyte solution bath. In any event, because of the need to reduce current density as the silver ion concentration is depleted, I prefer to terminate the "foul" electrolyte electrolysis when a silver ion concentration of between about 5 and about 30 grams per liter is reached.

Silver plated on the cathode during the "foul" electrolyte electrolysis is recovered in the same fashion as that from the main electrolysis described above. The silver-bearing electrodes are first rinsed with water to remove residual salts from the electrolyte solution and then oven dried. After drying, the silver is stripped from the electrode. Silver of a purity as high as 99.9 percent or higher is recovered.

Some silver sludge may also form in the solution bath during the "foul" electrolyte electrolysis. After completion of this electrolysis, the solution bath is filtered in a fashion similar to the filtration following the main electrolysis, and the sludge recovered is similarly recycled or otherwise processed.

After termination of the "foul" electrolyte electrolysis residual silver ions remaining in the solution bath may be recovered by precipitation with a water soluble compound whose anionic component forms an insoluble compound with silver. The water soluble compound used should not be such that it will precipitate the ions of other metals present in the solution. A compound I have found particularly convenient for precipitating silver ion is sodium chloride. In precipitating the silver ion, the water soluble compound, such as sodium chloride, is added to the electrolyte solution in at least stoichiometric equivalence to the quantity of silver ions present. The water soluble precipitating compound may be added to the electrolyte solution in solid or solution form. After precipitation, the silver compound formed is separated from the solution as by filtration.

It will be understood, of course, that an insoluble silver compound could be precipitated from the electrolyte solution bath immediately on termination of the electrolytic recovery step without going through the "foul" electrolyte recovery step. Use of the "foul" electrolyte electrolysis is normally desirable, however, since it allows recovery of a greater proportion of the silver from the scrap in elemental rather than in combined form. Considering the main electrolysis, "foul" electrolyte electrolysis, and chemical precipitation steps, overall recovery of silver from the scrap material is in the range of 99 percent.

When the scrap material from which silver is recovered also contains cadmium and cadmium compounds, the solution following the above-described silver recovery steps still contains cadmium ions, often in substantial quantity. The cadmium can be recovered by precipitation using a water soluble compound whose anionic component reacts with the cadmium ions to form an insoluble compound. The compound used should preferably not precipitate the ions of other metals found in the solution. ONe water soluble compound useful for precipitation of cadmium is sodium hydroxide. To precipitate the cadmium, the water soluble compound is added to the solution in at least stoichiometric equivalence to the quantity of cadmium ions present. If sodium hydroxide is used, a sufficient excess must be added to neutralize the sulfamic acid present in the bath and to reach a pH of about 8 to 9. The water soluble compound may be added to the bath in either solid or solution form. After precipitation, the insoluble cadmium compound formed is separated from the solution, as by filtration. Recovery of cadmium is in the range of 99 percent of that present in the scrap.

The solution remaining after filtration to recover the cadmium compound may be discarded, or it may be further processed to recover the sulfamate ions in the form of sulfamic acid. Sulfamic acid may be precipitated from the solution by addition of sulfuric acid, leaving in solution the sulfate salts of whatever metals, such as nickel, cobalt and copper, remain.

Alternatively, but less preferably, it will be understood that the solution resulting from the "foul" electrolysis step and containing a substantial quantity of cadmium ions may be subjected to further electrolysis in order to electrodeposit the cadmium. However, the plating conditions must be carefully controlled to prevent codeposition of other metals with cadmium.

In view of the above, it will be seen that the several objects of the invention are achieved and other advantageous results attained.

As various changes could be made in the above methods and products without departing from the scope of the invention, it is intended that all matter contained in the above description or shown in the accompanying drawing shall be interpreted as illustrative and not in a limiting sense.

What is claimed is:

1. A process for recovering substantially pure silver from silver-bearing scrap material which comprises immersing an anode of said scrap material and a cathode of a corrosion-resistant material in an electrolyte comprising an aqueous solution of silver sulfamate, a glutamic acid compound selected from the group consisting of glutamic acid and the water soluble salts thereof, and an amount of free sulfamic acid, electrolyzing said solution to electrolytically dissolve the silver in said anode, and depositing the silver at the cathode without substantial codeposition of any other metals present in said scrap material.

2. A process as set forth in claim 1 wherein said silver-bearing scrap material contains materials selected from the group consisting of silver, silver oxide, cadmium, cadmium oxide and other metals in elemental or combined form.

3. A process as set forth in claim 2 wherein the metals in elemental form in said scrap material dissolve electrolyitically during electrolysis, the metals in combined form in said scrap material dissolve chemically in said electrolyte, and all metals other than silver accumulate in the electrolyte during electrolysis.

4. A process as set forth in claim 1 wherein said electrolyte is prepared by adding silver oxide to water, heating the resulting mixture, adding an amount of sulfamic acid to the mixture to dissolve the silver oxide, in excess of the stoichiometric amount required to react with the silver present to form silver sulfamate, adding said glutamic acid compound to the resulting solution, and thereafter removing impurities which plate out preferentially to silver by subjecting the solution to electrolysis in the presence of inert electrodes.

5. A process as set forth in claim 2 wherein, upon termination of electrolysis, the resulting electrolyte is thereafter separately subjected to further electrolysis in which an inert electrode is employed as the anode and a corrosion-resistant material is employed as the cathode, substantially pure silver being deposited at the cathode and the silver ion concentration of the electrolyte being substantially depleted as electrolysis proceeds.

6. A process as set forth in claim 5 wherein, upon termination of said further electrolysis, the resulting electrolyte is further treated by adding thereto a water soluble compound whose anionic component reacts with silver ions remaining in the electrolyte to form an insoluble silver compound, and the resulting precipitate of the insoluble silver compound is recovered by filtration.

7. A process as set forth in claim 6 wherein the solution resulting from said filtration is subjected to further treatment by adding thereto a water soluble compound whose anionic component reacts with cadmium ions to form an insoluble cadmium compound and the resulting precipitate of the insoluble cadmium compound is recovered by filtration.

8. A process as set forth in claim 2 wherein, upon termination of the said electrolysis, the resulting electrolyte is further treated by adding thereto a water soluble compound whose anionic component reacts with silver ions to form an insoluble silver compound, the resulting precipitate of the insoluble silver compound is recovered by filtration, the solution resulting after recovery of the silver compound is subjected to further treatment by adding thereto a water soluble compound whose anionic component reacts with cadmium ions to form an insoluble cadmium compound, and the resulting precipitate of the insoluble cadmium compound is recovered by filtration.

9. A process as set forth in claim 1 wherein said glutamic acid compound is monosodium glutamate monohydrate.

10. A process as set forth in claim 4 wherein the resulting electrolyte contains between approximately 60 and 140 grams of silver ions per liter, between approximately 5 and 15 grams of monosodium glutamate monohydrate per liter and an amount of between approximately 7 and 15 grams of free sulfamic acid per liter.

11. A process as set forth in claim 1 wherein, during electrolysis, the temperature of the electrolyte is maintained between approximately 140° F. and 170° F., the current density is between approximately 30 and 300 amperes per square foot and the electrolyte contains between approximately 60 and 140 grams of silver ions per liter, between approximately 5 and 15 grams of monosodium glutamate monohydrate per liter, an amount of between approximately 7 and 15 grams of free sulfamic acid per liter and less than approximately 260 grams of cadmium ions per liter.

12. A process as set forth in claim 11 wherein electrolysis is terminated when the cadmium ion concentration is between approximately 200 and 260 grams per liter.

13. A process as set forth in claim 6 wherein said water soluble compound is sodium chloride.

14. A process as set forth in claim 7 wherein said water soluble compound is sodium hydroxide.

15. A process for recovering substantially pure silver from silver-bearing scrap material containing materials selected from the group consisting of silver, silver oxide, cadmium, cadmium oxide and other metals in elemental or combined form which comprises the steps of preparing an aqueous electrolyte solution containing between approximately 60 and 140 grams of silver ions per liter, between approximately 5 and 15 grams per liter of a glutamic acid compound selected from the group consisting of glutamic acid and the water-soluble salts thereof, and an amount of between approximately 7 and 15 grams of free sulfamic acid per liter, immersing an anode of said scrap material and a cathode of a corrosion-resistant material in said solution, electrolyzing said solution while maintaining the temperature thereof at a temperature between approximately 140° F. and 170° F. and the current density between approximately 30 and 300 amperes per square foot, silver and any other metals in elemental form in the scrap material being dissolved electrolytically and any metals in the combined form in the scrap material being dissolved chemically in the solution, depositing the silver at the cathode without substantial codeposition of any other metals in the scrap material, subjecting the resulting electrolyte to further electrolysis at a temperature between about 140° F. and 170° F. and a current density of not more than 300 amperes per square foot, in which an inert electrode is employed as the anode and a corrosion-resistant material is employed as the cathode to thereby deposit substantially pure silver at the cathode, and thereafter treating the resulting electrolyte with a water soluble compound whose anionic component reacts with silver ions remaining in the electrolyte to form an insoluble silver salt and recovering the resulting precipitate by filtration.

16. In an electrolytic process for recovering substantially pure silver from silver-bearing scrap material in which the scrap material is employed as the anode and a corrosion-resistant material is employed as the cathode, the improvement which comprises carrying out the electrolysis in an electrolyte comprising an aqueous solution of silver sulfamate, a glutamic acid compound selected from the group consisting of glutamic acid and the water soluble salts thereof, and an amount of free sulfamic acid.

17. An electrolytic process as set forth in claim 16 wherein, during said electrolysis, the temperature of the electrolyte is maintained between approximately 140° F. and 170° F., the current density is between 30 and 300 amperes per square foot and the electrolyte contains between approximately 60 and 140 grams of silver ions per liter, between approximately 5 and 15 grams of monosodium glutamate monohydrate per liter, an amount of free between approximately 7 and 15 grams of sulfamic acid per liter and less than approximately 260 grams of cadmium ions per liter.

18. An electrolytic process as set forth in claim 17 wherein electrolysis is terminated when the cadmium ion concentration is between approximately 180 and 260 grams per liter.

19. An electrolyte composition for use in the recovery of substantially pure silver from silver-bearing scrap materials which comprises an aqueous solution containing silver sulfamate, a glutamic acid compound selected from the group consisting of glutamic acid and the water soluble salts thereof, and an amount of free sulfamic acid.

20. An electrolyte composition as set forth in claim 19 wherein said glutamic acid compound is monosodium glutamate monohydrate.

21. An electrolyte composition as set forth in claim 20 wherein said solution contains between approximately 60 and 140 grams of silver ions per liter, between approximately 5 and 15 grams of monosodium glutamate monohydrate per liter and an amount of between approximately 7 and 15 grams of free sulfamic acid per liter.

22. An electrolyte composition as set forth in claim 21 additionally containing an anionic surfactant.

* * * * *